(12) United States Patent
Morris

(10) Patent No.: US 6,972,936 B2
(45) Date of Patent: *Dec. 6, 2005

(54) PRE-EMPTIVE CIRCUIT BREAKER WITH ARC FAULT AND FAULT LOCKOUT SHORT CIRCUIT PROTECTION

(76) Inventor: Robert Allan Morris, 56 Nassahegan Dr., Burlington, CT (US) 06013

( * ) Notice: Subject to any disclaimer, the term of this patent is extended or adjusted under 35 U.S.C. 154(b) by 217 days.

This patent is subject to a terminal disclaimer.

(21) Appl. No.: 10/112,441

(22) Filed: Mar. 29, 2002

(65) Prior Publication Data

US 2003/0184931 A1 Oct. 2, 2003

(51) Int. Cl.[7] ............................. H02H 9/08; H02H 3/00
(52) U.S. Cl. .............................. 361/42; 361/43; 361/72
(58) Field of Search ............................. 361/42, 43, 44, 361/45, 59, 62, 71, 72, 73, 74, 75

(56) References Cited

U.S. PATENT DOCUMENTS

| | | | | |
|---|---|---|---|---|
| 4,672,501 A | * | 6/1987 | Bilac et al. ................... | 361/96 |
| 4,878,144 A | * | 10/1989 | Nebon ......................... | 361/96 |
| 5,357,394 A | * | 10/1994 | Piney ........................... | 361/72 |
| 5,784,237 A | * | 7/1998 | Velez .......................... | 361/62 |
| 5,818,671 A | | 10/1998 | Seymour et al. | |
| 5,889,643 A | * | 3/1999 | Elms ........................... | 361/42 |
| 5,936,817 A | * | 8/1999 | Matsko et al. ............... | 361/72 |
| 6,002,561 A | | 12/1999 | Dougherty | |
| 6,232,857 B1 | | 5/2001 | Mason, Jr. et al. | |
| 6,246,558 B1 | * | 6/2001 | DiSalvo et al. .............. | 361/42 |
| 6,633,467 B2 | * | 10/2003 | Macbeth et al. ............. | 361/42 |
| 6,657,837 B1 | * | 12/2003 | Morris et al. ................ | 361/72 |

* cited by examiner

Primary Examiner—Stephen W. Jackson
Assistant Examiner—Danny Nguyen

(57) ABSTRACT

Fault abatement circuit breaker for providing protection of critical loads. The circuit breaker provides both arc fault protection and fault lockout protection in one integrated circuit breaker. The fault lockout protection reduces the risk of short circuit damage by predicting and preventing the event. The arc fault protection trips the circuit breaker when arcing is sensed. The integrated circuit thus provides for a minimum of short circuit damage, thereby maximizing process and/or equipment up time.

26 Claims, 9 Drawing Sheets

PRE-EMPTIVE CIRCUIT BREAKER WITH ARC FAULT AND FAULT LOCKOUT SHORT CIRCUIT PROTECTION

FIELD OF THE INVENTION

The present invention relates generally to a circuit breaker. More specifically the present invention relates to a circuit breaker with arc fault and fault lockout short circuit protection.

BACKGROUND OF THE INVENTION

Circuit breakers for protecting loads have been generally known for some time. Circuit breakers are important in reducing serious injuries, fires, and other hazards that may result from arcing. A number of products and processes have been separately added to increase short circuit protection, including arc fault circuit breakers and fault lockout protection. For example, U.S. Pat. No. 6,232,857 to Mason et al., which is hereby incorporated by reference, describes an arc fault circuit breaker, and U.S. application Ser. No. 09/473,420 filed Dec. 28, 1999, which is hereby incorporated by reference, describes fault lockout protection.

In addition, it is important to minimize and limit damage to electrical equipment due to arcing, overcurrent, and other electrical problems. It would also be desirable to limit the damage to electrical insulation of a piece of electrical equipment and maximize equipment and/or process up time while adding the benefit of reducing the risk of fire and personnel injury.

In accordance with the terms used throughout the circuit protection industry, circuit breaker "making capacity" describes the ability to close a circuit breaker onto a high level short circuit current associated with a low power factor. The so-called "making current" peak value, depending on switching transients and the point on the associated voltage wave closing angle for power factors between 0.15 and 0.20 is in the order of 2.309 to 2.183 times the rms current value. With a low power factor equal to approximately 0.04, the making current peak value can reach 2.663 times the rms current value. An rms fault current level of 100 KA, for example, would result in closing the circuit breaker onto a peak short circuit current of roughly 230 KA for 0.15 power factor. Most industrial-rated circuit breakers, however, are designed to interrupt, that is break, overload short circuit values that are significantly less than 150 KA. Accordingly, components within the circuit breaker operating mechanism are made of large mechanical structure to withstand the high mechanical and thermal stress associated with such short circuit currents. In addition, arcing must be more precisely controlled, the latching sequence must be more precise, and the degree of contact bounce that can be tolerated must be reduced to accommodate the short circuit currents.

Since the short circuit interruption-breaking current values occurring within an industrial electrical distribution system are much lower than peak closing short circuit current values, eliminating the need for a circuit breaker operating mechanism to close and latch onto a short circuit fault would subject the circuit breaker contacts and closing mechanism to considerably less mechanical and thermal stress. Therefore, eliminating the need for the circuit breaker to close and latch onto a short circuit fault would obviate the need for a stronger latching mechanism and would relax tolerances on the control of arcing, the latching sequence, and the degree of contact bounce.

Arc fault circuit breakers typically comprise a pair of separable contacts, per phase, that open (trip) upon sensing an arcing current from line to ground, and/or from line to neutral, and/or from line to line. Arc fault circuit breakers typically use a differential, zero sequence, transformer to measure arcing from line to ground. Detecting arcing from line to neutral and /or line to line is accomplished by detecting rapid changes in load current by measuring voltage drop across a relatively constant resistance, usually a bimetallic element (bimetal) and/or a shunt element. Additionally, during over current conditions (i.e., above rated current) the bimetal heats up and flexes a predetermined distance to engage a primary tripping mechanism and trip the circuit breaker. The circuit breaker may alternatively have an electronic trip means with the over current conditions sensed by means of current transformers in each phase and a sensing electronic programmer detecting a fault conditions and tripping the circuit breaker, as shown, for example, in U.S. Pat. No. 4,589,052 to Dougherty, which is hereby incorporated by reference.

Other electronic circuit breakers including bimetal circuit breakers can be found in U.S. Pat. Nos. 4,679,016 and 4,754,247, which are hereby incorporated by reference.

Bimetal trip circuit breakers are designed either as directly heated or indirectly heated. When the bimetal is directly heated, current flows through the bimetal itself, and thus the design is typically limited to about 100 A. For higher current-rated bimetal trip circuit breakers, the bimetal is mounted adjacent to a heater element, which in turn heats the bimetal. The current flows through the heater element, no current passes through the bimetal in the heater designs.

Components of arc fault circuit breakers are generally assembled into separate compartments as defined by their function. More specifically, mechanical components (e.g., load current carrying and switching components) of each pole are assembled into mechanical compartments, while the current sensing components are assembled into an electronics compartment. In order to connect the compartments, the load current of each pole must be routed from the mechanical compartments into the electronics compartment, through appropriate current sensing devices, and back into the mechanical compartments. Additionally, conductors or sensing lines (e.g., wires connected to the bimetal or shunt), must also be routed from the mechanical compartment into the electronics compartment.

The bimetal has a dual function. First, it engages the circuit breaker's primary tripping mechanism to trip the circuit breaker during over current conditions (e.g., above its rated current of 10 to 600 amps or more). Second, it also detects multiple, instantaneous, high-current arcing (e.g., 70 to 500 amps or more) from line to neutral or line to line. In electronic over current trip sensing, the circuit breaker shunt detects multiple, instantaneous, high-current arcing (e.g. 70 to 500 amps or more) from line to neutral or line to line.

The bimetal or shunt element utilizes its relatively constant resistance. The voltage drop across the element is sensed by sensing lines and processed by circuitry (e.g., a printed circuit board) located in the electronics compartment to detect the arcing. When voltage drops indicative of arcing are detected, the circuitry generates a trip signal to activate the tripping mechanism and trips the circuit breaker.

SUMMARY OF THE INVENTION

The present invention meets the above-described needs and others. Specifically, the present invention provides an integrated circuit breaker including an arc fault protection portion and a fault lockout protection portion. The circuit breaker may further include an enclosure for housing the arc fault protection portion and the fault lockout protection portion.

According to one aspect of the circuit breaker, the arc fault protection portion of the circuit breaker includes multiple pairs of separable contacts for interrupting current to a protected load; a first housing having a first compartment enclosing the pair of separable contacts; a second housing having a second compartment and having at least one opening, communicating between the first compartment and the second compartment, the second housing assembled to the first housing to enclose the first compartment; a bimetallic or shunt element having a resistance thereby generating a voltage signal indicative of the fault current, the bimetallic or shunt element disposed within the first compartment and conducting the current therethrough; a connecting stud extending from the bimetallic or shunt element into the second compartment through the at least one opening; a conductor electrically connected to the bimetallic or shunt element and routed into the second compartment through the at least one opening, the conductor and the stud conducting the voltage signal indicative of the current; and a circuit board having a circuit thereon disposed within the second compartment, the circuit board electrically connected to the conductor and the stud, wherein the circuit board processes the voltage signal to determine if a fault or over current condition exists.

According to one aspect of the circuit breaker the circuit board may include a first conductive path disposed on the circuit board, the first conductive path electrically connected to the stud for conducting the voltage signal; and a second conductive path disposed on the circuit board, the second conductive path electrically connected to the conductor for conducting the voltage signal; with the first and second conductive paths running substantially parallel and proximate to each other for a predetermined distance.

According to one aspect of the circuit breaker, the bimetallic element is calibrated to flex a predetermined distance when a predetermined current threshold is reached.

According to one aspect of the circuit breaker, the circuit board processes the voltage signal to detect arcing of the current, the circuit board generating a trip signal to trip the circuit breaker when the arcing is detected.

According to one aspect of the circuit breaker, the at least one opening may include a first opening having the stud extend therethrough, and a second opening having the conductor routed therethrough. The first and second conductive paths may be traces disposed on the circuit board.

According to one aspect of the circuit breaker, the fault lockout portion may include a fault lockout protection controller for providing fault lockout protection in the circuit breaker, the circuit breaker having a plurality of contacts forming part of an electrical distribution circuit, the contacts being separable to isolate a load side of the electrical distribution circuit from a line side of the electrical distribution circuit, the line side having a line voltage, the fault lockout protection controller including: a sensing device arranged for sensing a first test current in the load side of the electrical distribution circuit, the first test current being induced by a first test voltage, the first test voltage being less than the line voltage and having a first frequency, the sensing device providing a first sensed signal indicative of an electrical characteristic of the first test current; a processor arranged to detect a fault condition on the load side of the electrical distribution circuit in response to the first sensed signal, the processor generating a fault lockout signal when the fault condition is detected; and a fault lockout device arranged to prevent closure of the plurality of contacts in response to the fault lockout signal.

According to one aspect of the circuit breaker, the fault lockout protection controller may further include a fault lockout flag arranged to provide indication of the fault condition in response to the fault lockout signal.

According to one aspect of the circuit breaker, the fault lockout protection controller may further include a signal generator arranged to receive a first initiating signal from the processor and generate a first voltage signal in response to the first initiating signal; and a voltage transformer arranged to provide the first test voltage to the load side of the distribution circuit in response to the first voltage signal.

According to one aspect of the circuit breaker, the signal generator may be arranged to receive a second initiating signal from the processor and generate a second voltage signal in response to the second initiating signal; the voltage transformer may be further arranged to provide a second test voltage having a second test frequency to the load side of the distribution circuit in response to the second voltage signal; the sensing device may be further arranged for sensing a second test current in the load side of the electrical distribution circuit, the second test current being induced by the second test voltage, the sensing device providing a second sensed signal indicative of an electrical characteristic of the second test current; and the processor may be further arranged to detect a fault condition on the load side of the electrical distribution circuit in response to the first and second sensed signals. The sensing device may be a current transformer.

According to one aspect of the circuit breaker, the processor calculates a value indicative of a load side current in response to the first sensed signal and compares the value to a predetermined current threshold to detect the fault condition.

According to one aspect of the circuit breaker, the processor calculates a value indicative of a load side impedance in response to the first sensed signal and compares the value to a predetermined impedance threshold to detect the fault condition.

According to one aspect of the circuit breaker, the circuit breaker may further include an impedance device arranged parallel to the plurality of contacts, the impedance device for reducing the line voltage to the first test voltage. The impedance device may be arranged to increase the first test voltage over a period of time. The impedance device may be a silicon controlled rectifier.

According to one aspect of the circuit breaker, the fault lockout portion may include a plurality of contacts forming part of an electrical distribution circuit, the contacts being separable to isolate a load side of the electrical distribution circuit from a line side of the electrical distribution circuit, the line side having a line voltage; a sensing device arranged for sensing a first test current in the load side of the electrical distribution circuit, the first test current being induced by a first test voltage, the first test voltage being less than the line voltage and having a first frequency, the sensing device providing a first sensed signal indicative of an electrical characteristic of the first test current; a processor arranged to detect a fault condition on the load side of the electrical distribution circuit in response to the first sensed signal, the processor generating a fault lockout signal when the fault condition is detected; and a fault lockout device arranged to prevent closure of the plurality of contacts in response to the fault lockout signal. The circuit breaker may also include a fault lockout flag arranged to provide indication of the fault condition in response to the fault lockout signal.

According to one aspect there is disclosed a method of providing fault lockout protection and arc fault protection in a circuit breaker, the method including: sensing a first test current to provide a first sensed signal indicative of an electrical characteristic of the first test current; detecting a fault condition on the load side of the electrical distribution circuit in response to the first sensed signal; sensing voltage across a bimetal to provide a second sensed signal indicative of an electrical characteristic of the voltage across the bimetal; and detecting an arc fault condition when rapid changes in the voltage across the bimetal are sensed.

The method may further include preventing closure of the separable circuit breaker contacts upon detection of a fault condition on the load side of the electrical distribution circuit and tripping the circuit breaker upon detection of an arc fault condition.

According to one aspect of the method, the voltage is sensed by electrically connecting a wire from the bimetal or shunt element to current sensing components.

According to one aspect of the method, the circuit breaker includes a plurality of contacts forming part of an electrical distribution circuit, the contacts being separable to isolate a load side of the electrical distribution from a line side of the electrical distribution circuit, the line side having a line voltage. The method may also include providing a first test voltage at a first frequency to the load side of the electrical distribution circuit to induce the first test current in the load side of electrical distribution circuit, the first test voltage being less than the line voltage; and providing a second test voltage at a second frequency to the load side of the distribution circuit to induce a second test current in the load side of the distribution circuit, the second test voltage being less than the line voltage. The second test current on the load side of the electrical distribution circuit may provide a third sensed signal indicative of the electrical characteristic of the second test current, the detecting the fault condition on the load side of the electrical distribution circuit being in response to the first and third sensed signals.

According to one aspect of the method, there is scanning a plurality of harmonic frequencies in the load side of the electrical distribution circuit; and comparing the plurality of harmonic frequencies to a predetermined frequency threshold to determine the first and second frequencies.

According to one aspect of the method, the detecting a fault condition on the load side of the electrical distribution circuit includes calculating a value indicative of a load side current in response to the first sensed signals and comparing the value to a predetermined current threshold.

According to one aspect of the method, the detecting a fault condition on the load side of the electrical distribution circuit includes calculating a value indicative of a load side impedance in response to the first sensed signal and comparing the impedance value to a predetermined impedance threshold.

According to one aspect of the method, there is disclosed scanning a plurality of harmonic frequencies in the load side of the electrical distribution circuit and comparing the plurality of harmonic frequencies to a predetermined frequency threshold to determine the first and second frequencies.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Throughout the drawings, identical elements are designated by identical reference numbers.

DETAILED DESCRIPTION OF PREFERRED EMBODIMENTS

The preceding description has been presented only to illustrate and describe the invention. It is not intended to be exhaustive or to limit the invention to any precise form disclosed. Many modifications and variations are possible in light of the above teaching.

Figure 1:
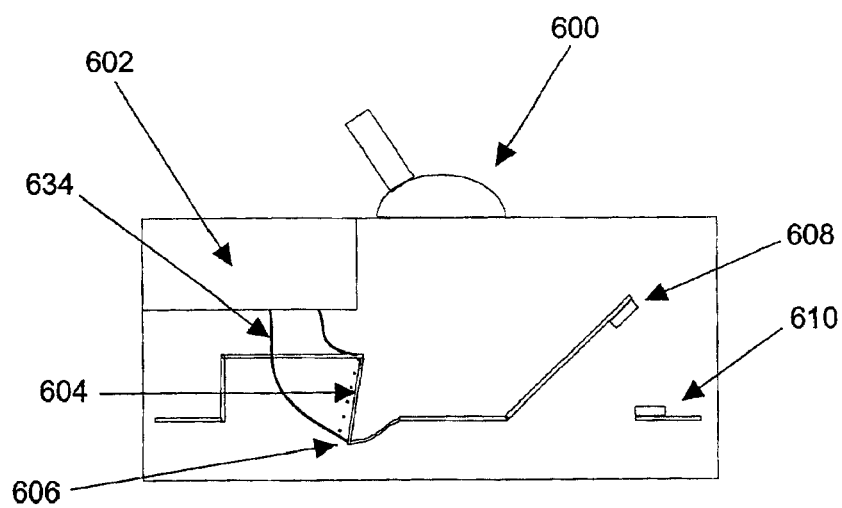
FIG. 1 shows an arrangement of arc fault detection apparatus according to one embodiment of the present invention.

Turning now to the figures, and in particular to FIG. 1, a circuit breaker 600 with an arc fault detector module 602 is shown. Arc fault detection module 602 may be similar or identical to the arc fault detection module found in U.S. Pat. No. 6,002,561 to Dougherty, which is hereby incorporated by reference.

Circuit breaker 600 may also include a directly heated bimetal or shunt 604 over-current trip system typically used in residential and industrial circuit breakers capable of carrying currents up to about 100 A. In the embodiment shown, one pole of a three pole circuit is shown, but single pole and two pole configurations may also be used.

As current flows through bimetal 604, the bimetal tends to heat, causing the bimetal to deflect, for example to the position represented by dashed line 606. The deflection of bimetal 604 facilitates inverse time/current tripping characteristics for overcurrent and overload conditions.

Further, the bimetal element also has a known resistive-impedance such that voltage drops thereacross may be sensed, and certain voltage drops may indicate an arc fault current. When certain voltage drops are sensed, arc fault detection module 602, which may include signal filtering, analysis, and detection means on a printed circuit board (PCB), compares the voltage drop signal to known references. If the signal detected is positive for an arcing fault current, a trip signal is generated by arc fault detection module 602 and the signal is sent to an actuating solenoid (not shown) to trip the circuit breaker 600, which opens contacts 608 and 610.

Figure 2:
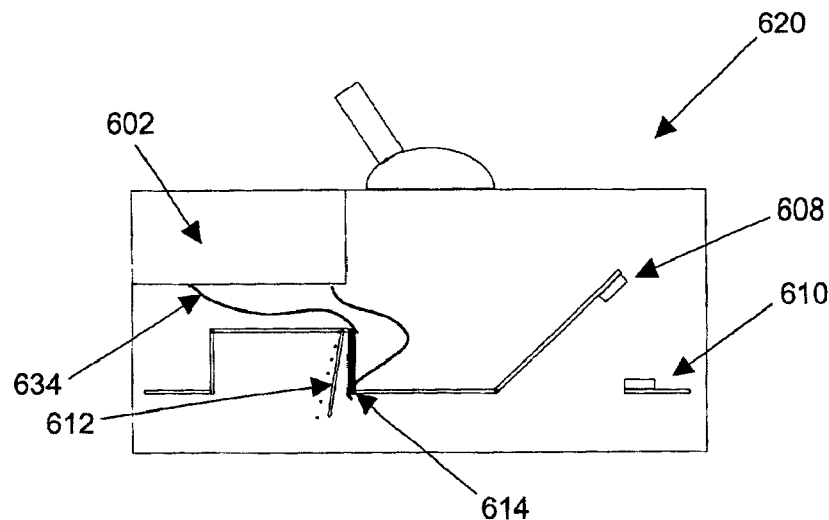
FIG. 2 shows another arrangement of arc fault detection apparatus according to one embodiment of the present invention.

In another embodiment shown as FIG. 2, a circuit breaker 620 with an indirectly heated bimetal 612 is shown. According to this embodiment, current does not flow though the bimetal but instead flows through a heater 614. Circuit breaker 620 may be used in industrial settings with currents of up to 600 A or more. Bimetal 612 is adjacent heater 614 such that heat generated by current flowing through the heater element conducts to the bimetal. Thus, bimetal 612 may function in the same manner as bimetal 604 for inverse time/current tripping characteristics for overcurrent and overload conditions. But much higher currents may be used for circuit breaker 620 with the use of heater 614.

Further, the heater element also has a known resistive-impedance such that voltage drops thereacross may be sensed, and certain voltage drops may indicate an arc fault current. When certain voltage drops are sensed, arc fault detection module 602, which may include signal filtering, analysis, and detection means on a printed circuit board (PCB), compares the voltage drop signal to known references. If the signal detected is positive for an arcing fault current, a trip signal is generated by arc fault detection module 602 and the signal is sent to an actuating solenoid (not shown) to trip the circuit breaker 620, which opens contacts 608 and 610.

Figure 3:
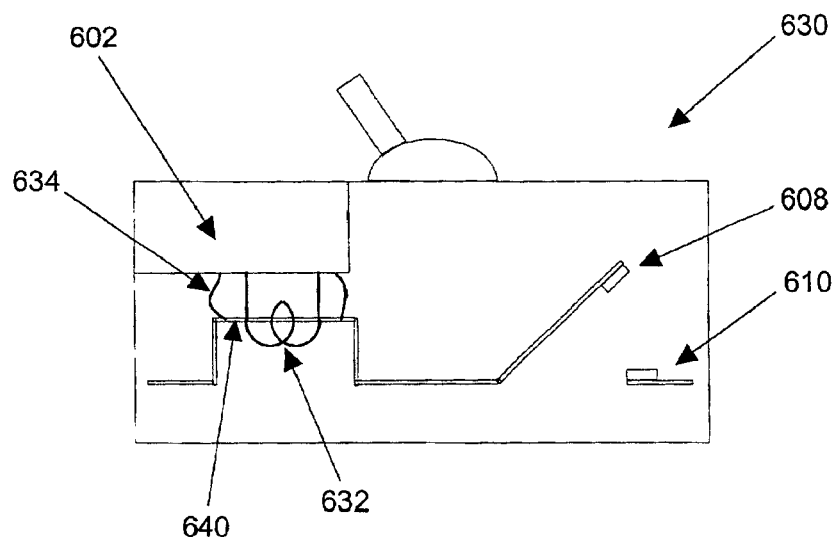
FIG. 3 shows another arrangement of arc fault detection apparatus according to one embodiment of the present invention.

In another embodiment shown as FIG. 3, a circuit breaker 630 with current transformer 632 is shown. According to this embodiment, current transformer 632 wrapped around shunt 640 senses current flowing through circuit breaker 630 and sends a voltage signal to combined electronic programmer and arc fault module 602A, the Signals from the current transformer 632 is sensed by the electronic programmer to detects overloads and/or short circuits, sending a tripping signal to an actuator that open contacts 608 and 610.

Further, the shunt element also has a known resistive-impedance such that voltage drops thereacross may be sensed, and certain voltage drops may indicate an arc fault current. When certain voltage drops are sensed, arc fault detection module 602, which may include signal filtering, analysis, and detection means on a printed circuit board (PCB), compares the voltage drop signal to known references. If the signal detected is positive for an arcing fault current, a trip signal is generated by arc fault detection module 602. The arc fault detection module 602, which may also use analog/digital electronics, a microprocessor, and software to detect arc faults. When an arc fault is detected, a signal is sent to an actuating solenoid (not shown) to trip the circuit breaker 630, which opens contacts 608 and 610.

In each of the embodiments of FIGS. 1–3, sensed voltage is connected to arc fault detection module 602 (which includes a printed circuit board (PCB) with arc fault detection means) by a pair of twisted wires 634, a coaxial cable, or other connectivity means to minimize electromagnetic interference.

Figure 4:
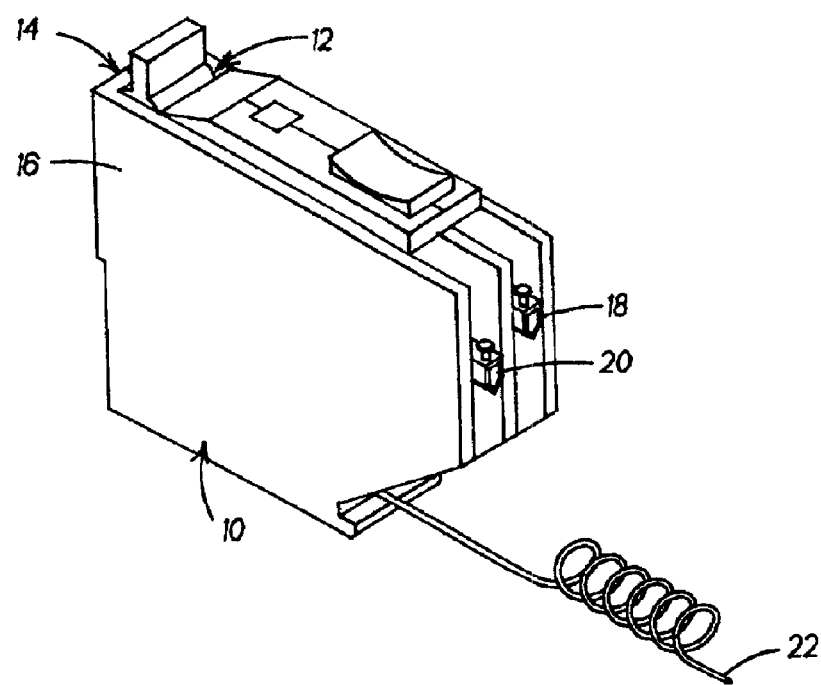
FIG. 4 is a perspective view of a first portion of a circuit breaker in an exemplary embodiment of the present invention.
Figure 5:
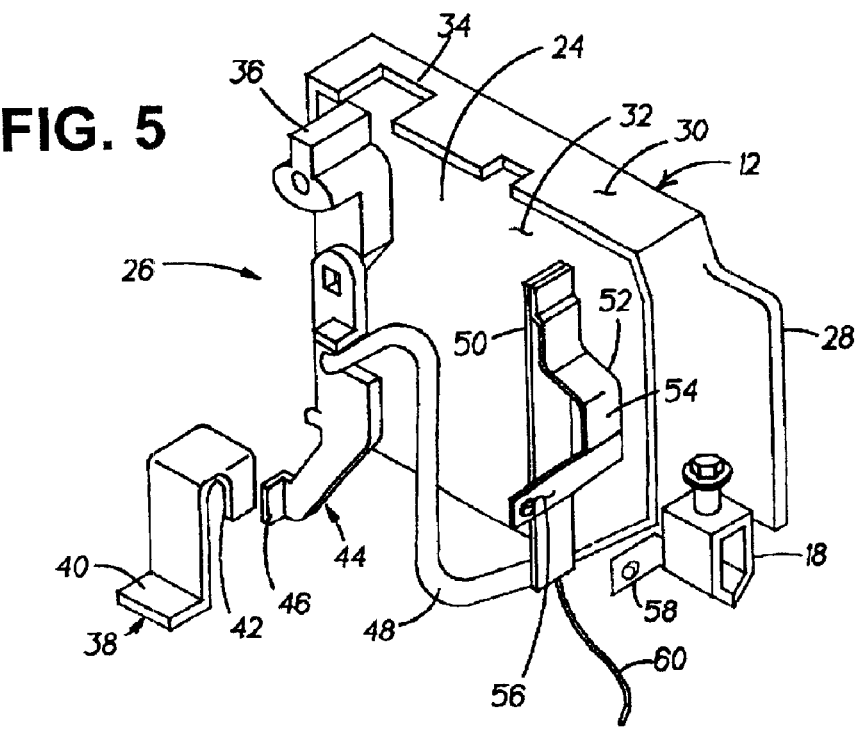
FIG. 5 is an exploded view of the mechanical compartment of the first portion of the circuit breaker of FIG. 4.
Figure 6:
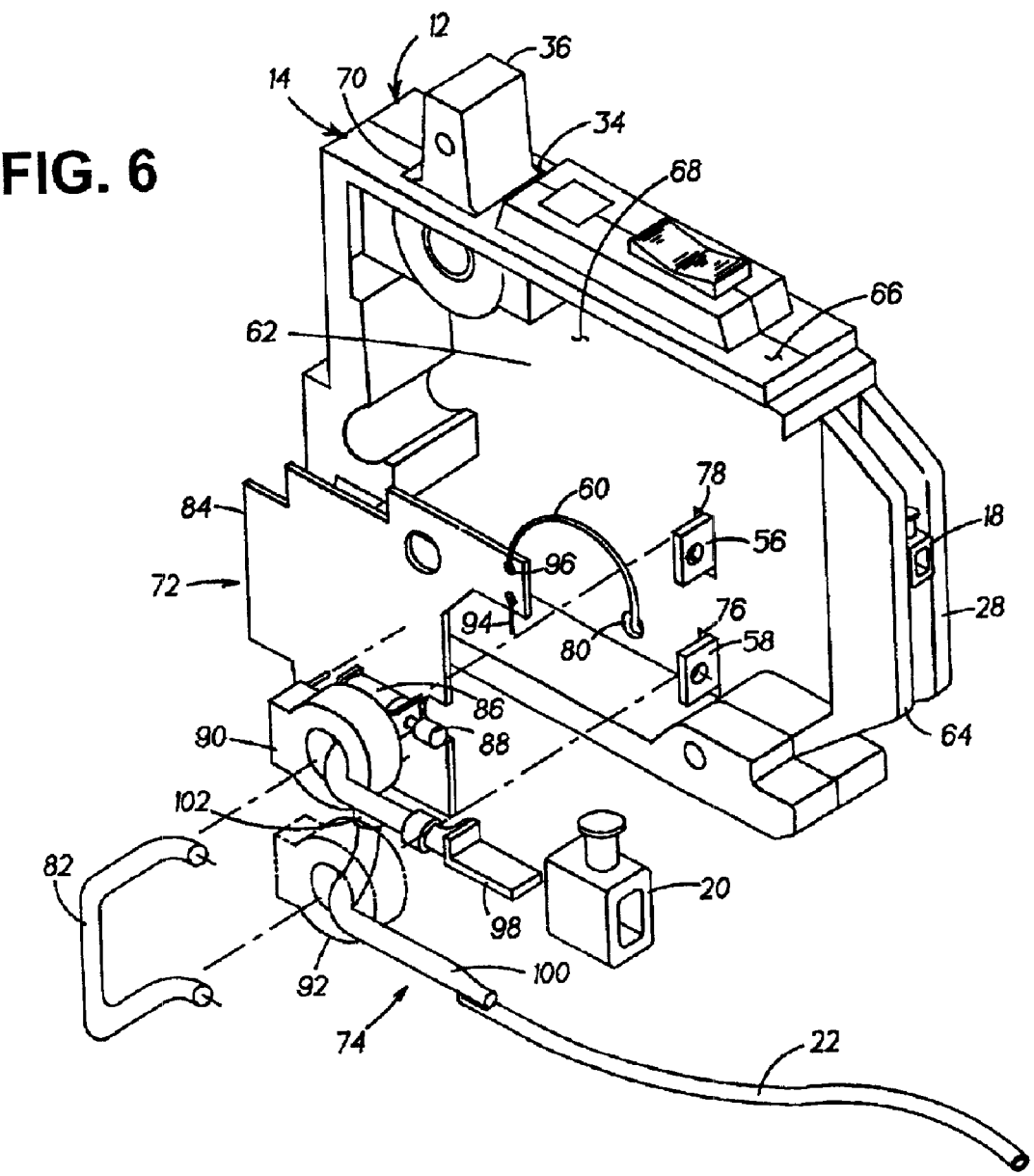
FIG. 6 is an exploded view of the electronics compartment of the first portion of the circuit breaker of FIG. 4.

Referring next to FIGS. 4, 5, and 6, an exemplary embodiment of a fully assembled, single pole, arc fault portion of a circuit breaker for use in residential applications is shown generally at 10. However, it will be understood by those of skill in the art having the benefit of this disclosure that other circuit breakers such as those described in FIGS. 1–3—or other circuit breakers—may also be used. Arc fault portion 10 comprises a first housing 12, a second housing 14, and a cover 16 that are assembled securely together with a plurality of permanent fasteners (not shown). First housing 12 defines a mechanical compartment 24, having load current carrying and switching components 26 disposed therein (see FIG. 5). Second housing 14 defines an electronics compartment 62, having current sensing components 72 and neutral current carrying components 74 disposed therein (see FIG. 6). A load current from a source (not shown) connects to line connection 38 (see FIG. 5), and conducts along the current carrying and switching components 26 to load lug 18 for customer connection to a load (not shown). A neutral current from the load connects to neutral lug 20 (see FIG. 6), and conducts along the neutral current carrying components 74 to neutral return wire 22 for customer connection to the source. Arc faults are sensed and processed by sensing components 72.

Referring to FIG. 5, the mechanical compartment 24 of arc fault portion 10 is shown in detail. First housing 12 is generally rectangular in shape, and formed of electrical insulative material such as plastic. First housing 12 comprises first insulative tab 28, first rim 30, and first side wall 32. First tab 28 protrudes forwardly from the front of first housing 12 adjacent load lug 18 to provide an insulative barrier. First rim 30 extends around the periphery of first side wall 32. A first rectangular slot 34 is located in rim 30 at the top and rear of first housing 12 and sized to receive pole handle 36. First side wall 32 and first rim 30 define the mechanical compartment 24 which includes the load current carrying and switching components 26. The load current carrying and switching components 26 within the mechanical compartment 24 are electrically connected (e.g., welded, bolted, or crimped) to form a load current path. The load current path begins at line connection 38 where the load current enters the mechanical compartment 24. Line connection 38 includes a lower tab 40 to connect to a source line (not shown), and a fixed contact 42 which extends downwardly from the upper end of line connection 38. Blade 44 is pivotally engaged to the first housing 12 and pivotally attached to insulated pole handle 36. A lower end of blade 44 includes a flat contact point 46 which is forcibly biased against contact point 42 to provide electrical continuity for the load current. Pole handle 36 is pivotally attached to first housing 12 and extends outwardly from mechanical compartment 24 into the electronics compartment 62 (see FIG. 3).

Blade 44 is electrically connected to a bottom end of bimetal element (bimetal) 50 via braided wire 48. A top end of bimetal 50 is, in turn, electrically connected to L-shaped strap 52. L-shaped strap 52 comprises a vertical strap body 54 and a horizontal stud extension 56. Horizontal stud 56 is substantially perpendicular to vertical strap body 54, and extends outwardly from mechanical compartment 24 into electronics compartment 62 as shown in FIG. 3. Load terminal 58 also extends outwardly from the mechanical compartment 24 into electronics compartment 62. Load terminal 58 is, in turn, electrically connected to the load lug 18. The load current path conducts the load current from the line connection 38, through contacts 42 and 46, through blade 44, braid 48, bimetal 50, and L-shaped strap 52. At this point, the load current path passes out of the mechanical compartment 24 through horizontal strap extension 56. The load current path returns to the mechanical compartment 24 through load terminal 58 and out through the load lug 18 to the load. When an arc fault is detected, the pole handle 36 pivots clockwise under the force of a tripping mechanism (not shown), causing blade 44 to pivot and separate contact points 42 and 46, thereby opening the load current path.

Bimetal 50 has a dual function. It engages and activates the primary tripping mechanism (not shown) for tripping the arc fault portions 10 of the circuit breaker during over current conditions (e.g., above the circuit breaker's rated current of 10 amps 15 amps, 20 amps, or other current). By utilizing the different expansion rates of its bimetal construction, the bimetal is calibrated to flex a predetermined distance at the circuit breaker's rated current. Once the rated current is exceeded, any additional flexing of the bimetal will engage and activate the tripping mechanism of the arc fault portion of the circuit breaker. Additionally, bimetal 50 provides relatively constant resistance in series with the current path. Therefore, the voltage drop across the bimetal is indicative of the current in the current path. Arcing from line to neutral results in rapid current changes (e.g., 70 to 500 amps peak) in the current path, which can be sensed as rapidly changing voltage across the bimetal.

Detecting arc faults from line to neutral is accomplished by sensing the rapidly changing voltage across the bimetal 50. The voltage sensed is by electrically connecting (e.g., welding) a single wire (sense line or conductor) 60 from the bottom end of bimetal 50 to the current sensing components 72 in the electronics compartment 62. Additionally, the top end of bimetal 50 is connected to the current sensing components 72 through the horizontal stud extension 56 to provide a return path for the voltage signal.

Advantageously, by utilizing stud extension 56, the number of sensing lines welded to the bimetal is reduced to a single line 60, as opposed to a pair of lines in prior art circuit breakers. This significantly reduces the number of connections made to the bimetal during assembly and, consequently, the risk of bending the bimetal and disturbing its sensitive calibration. Also, by reducing the number of connections to the bimetal, the problem of having to accommodate the free movement of the connections as the bimetal flexes is correspondingly reduced.

Referring to FIG. 6, the electronics compartment 62 of arc fault portion 10 is shown in detail. Second housing 14 is generally rectangular in shape and formed of electrical insulative material, for example plastic. Second housing 14 comprises second insulative tab 64, second rim 66, and second side wall 68. Second tab 64 protrudes forwardly from the front of second housing 14 adjacent neutral lug 20 to provide an insulative barrier. Second rim 66 extends around the periphery of second side wall 68. A second rectangular slot 70 is located in rim 66 and cooperates with slot 34 to receive and secure pole handle 36 when housings 12 and 14 are assembled together. Second side wall 68 and second rim 66 define the electronics compartment 62 of arc fault portion 10 of the circuit breaker, which includes the current sensing components 72 and the neutral current carrying components 74. The second housing 14 is assembled securely against first housing 12 with a plurality of permanent fasteners (not shown). When secured against first housing 12, second housing 14 encloses mechanical compartment 24 and insulates and secures load lug 18 between tabs 28 and 64.

Second side wall 68 of second housing 14 includes rectangular through holes 76 and 78 and circular through hole 80 to provide openings in the second housing 14 to permit the load terminal 58, horizontal stud 56 and wire 60 respectively, to extend through to the electronics compartment 62. The load current path is completed by electrically connecting stud 56 and load terminal 58 to the respective ends of the wire connector 82.

Current sensing components 72 comprise circuit board 84, which is electrically connected to solenoid 86, current sensing transformer 90, and optional current sensing transformer 92. Printed circuit board 84 is connected across the bimetal 50 by connecting, e.g., welding, square post 94 of printed circuit board 84 to wire connector 82 proximate the electrical connection between wire connector 82 and stud 56. Additionally, wire 60 from the bottom end of bimetal 50 is connected (e.g., welded) to stake 96 on printed circuit board 84. When an arc fault occurs from line to neutral, voltage across bimetal 50 changes rapidly. These rapid voltage changes are sensed by wire 60 and stud 56, which are connected across bimetal 50. Upon receiving the signals from wire 60 and stud 56, circuit board 84 amplifies and processes the voltage signal, and provides a trip signal to a solenoid 86 to trip the arc fault circuit breaker 10.

As more particularly discussed hereinafter, conductive paths (traces) 104, 105 and 106 on circuit board 84 (as shown in FIG. 74) receive the voltage signal to be processed by circuit board 84. Traces 104 and 106 are run substantially parallel and proximate to each other. This significantly reduces the effects of EMI on the voltage signals from bimetal 50, and prevents false trips. Unlike some circuit breakers, circuit board 84 advantageously eliminates the requirement to use expensive twisted or shielded (e.g., coaxial) wires to reduce EMI.

Solenoid 86 comprises trip rod 88 for engaging the trip mechanism (not shown) to pivot the pole handle 36 in response to the trip signal, and provides the means to trip the circuit breaker 10 under arc fault conditions. That is, when an arc fault is sensed, circuit board 84 generates a trip signal to actuate solenoid 86, which extends the trip rod 88 to activate the trip mechanism which pivots pole handle 36. The pole handle 36 pivots, which in turn pivots blade 44 to separate contacts 42 and 46 and thereby opens the load current path.

The neutral current carrying components 74 within the electronics compartment 62 are electrically connected (e.g., welded, bolted, or crimped) to form a neutral current path for the neutral current. The neutral current path begins at neutral lug 20 where the neutral current enters the electronics compartment 62. Neutral lug 20 secures the neutral lead connected to the load (not shown) against neutral terminal 98 to provide electrical continuity thereto. Neutral terminal 98 is electrically connected to neutral return wire 22 via copper braid 100. Insulated sleeve 102 surrounds a portion of copper braid 100 and provides electrical insulation between copper braid 100 and sense line 60. Copper braid 100 is routed through the center of sensing transformer 90 such that the flow of the neutral current through the center of transformer 90 is in the opposite direction of the flow of the load current through lead 82.

Both the copper braid 100 of the neutral current path, and wire connector 82 of the load current path are routed through the current sensing transformer 90 to sense fault currents from line to ground as is well known. This is accomplished by routing the flow of the neutral current through the sensing transformer 90 in the opposite direction to the flow of the load current. The total current flow through sensing transformer 90 thus cancels unless an external ground fault current is caused by arcing from line to ground. The resulting differential current, sensed by sensing transformer 90, is indicative of the ground fault current and is processed by circuit board 84. Arcing from line to ground is thereby detected.

Optional oscillating current transformer 92 is used for ground fault applications where a method is needed to detect improper wiring by the customer (e.g., the neutral current path is wired backwards). Copper braid 100 of the neutral current path is routed through the optional oscillating current transformer 92. The resulting signal, injected by oscillating current transformer 92 and sensed by current sensing transformer 90, is indicative of the neutral current resulting from improper wiring, and is processed by circuit board 84.

Figure 7:
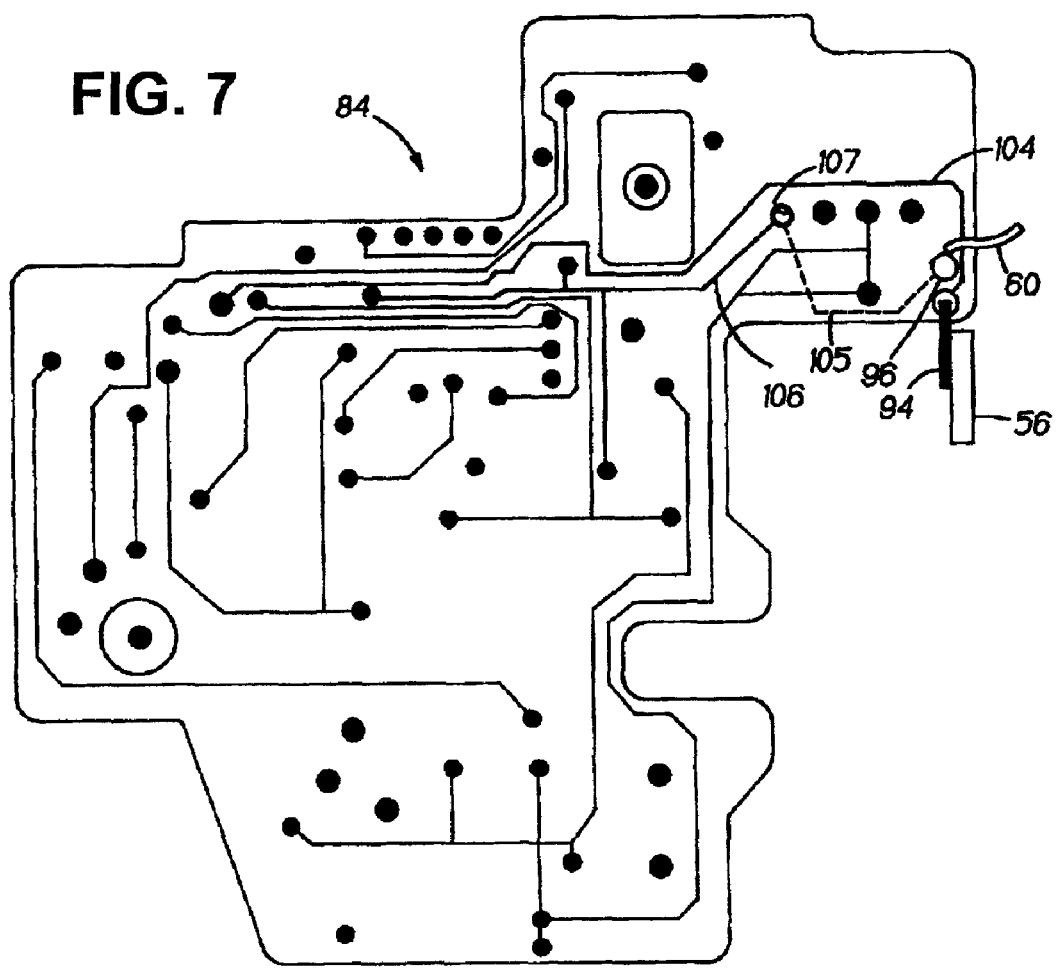
FIG. 7 is schematic view of the printed circuit board of the first portion of the circuit breaker of FIG. 3 in an exemplary embodiment of the present invention.

Referring to FIGS. 6 and 7, a detailed schematic of the conductive paths (traces) 104, 105 and 106 on circuit board 84 are shown in FIG. 7. Wire 60 from the bottom end of bimetal 50 is connected to stake 96. The voltage signal from the bimetal 50 travels through the stake 96 onto circuit board 84. Once on the circuit board 84, the signal travels along the conductive path formed by traces 105 and 106. Trace 105 (shown as a dotted line) is located on the opposite side of board 84 relative to trace 106, and connects stake 96 to trace 106 at through-hole 107. Trace 105 is located on the opposite side of board 84 to avoid contact with other components such as fault lockout portion 200 shown in FIG. 5. Substantially parallel and proximate to trace 106 is trace 104, which provides the return path for the voltage signal back through square post 94. Stud 56 is welded directly to square post 94 and acts as a grounding conductor to carry the voltage signal back to the top end of bimetal 50 through L shaped strap 52 (shown in FIG. 4).

Preferably, traces 104 and 106 are proximate to each other by a distance ranging from 0.8 mm to 1 mm, and run substantially parallel to each other to their points of termination. By placing traces 104 and 106 substantially parallel and proximate to each other, the effective coupling area (antenna) of traces 104 and 106 is minimized and, therefore, the possibility of EMI coupling is substantially reduced. Additionally, stud 56 further reduces the possibility of EMI coupling by eliminating a wire that would act as an antenna for the input signal. This significantly reduces the possibility of generating false trip signals due to EMI coupling. Advantageously, this eliminates the need to use expensive shielded wire, e.g., coaxial cable, or time consuming twisted pair wire to connect printed circuit board 84 to bimetal 50. Therefore, the time and cost of assembly is significantly reduced from that of the some of the prior art.

While the exemplary embodiment of the conductive paths on the circuit board 84 are shown as traces, one skilled in the art would recognize that the invention can apply to other conductive paths as well, e.g., embedded wires. While the exemplary embodiment of arc fault circuit breaker 10 is shown as a single pole circuit breaker, one skilled in the art would recognize that the invention can apply to multi-pole circuit breakers as well (e.g., two or three pole).

Figure 8:
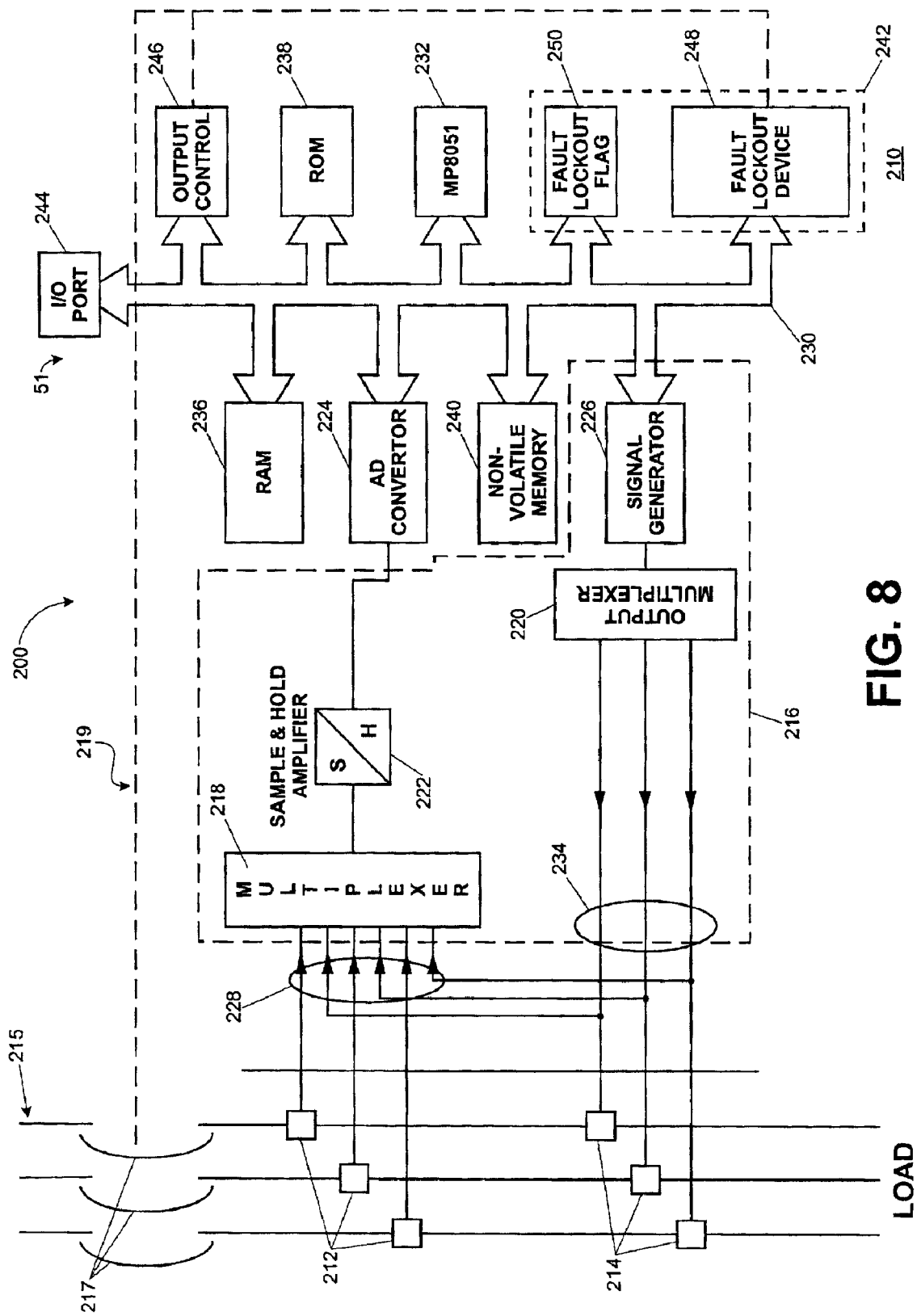
FIG. 8 is a schematic block diagram of a second portion of the present invention.

Arc fault portion 10, or any of circuit breakers 600, 620, and 630 may be integrated with a fault lockout portion 200. FIG. 8 shows a fault lockout protection controller 210 for detecting the existence of a short circuit fault and preventing closure of an associated set of circuit breaker contacts if a short circuit fault has been detected. Fault lockout protection controller 210 uses a fault current detection method described within U.S. patent application Ser. No. 09/474,821, entitled "Fault Current Detection Meter and Method," which was filed on Dec. 30, 1999 and is hereby incorporated by reference.

Fault lockout protection controller 210 is in the form of a printed circuit card with all the circuit components except the current transformers 212 and the potential transformers 214 mounted on circuit cards (not shown). Fault lockout controller 210 is contained within a circuit breaker enclosure along with the circuit breaker contacts and operating mechanism such as described within U.S. Pat. No. 4,754,247 entitled "Molded Case Circuit Breaker Accessory Enclosure", which is incorporated by reference. The circuit breaker enclosure may also house arc fault portion 10 of the circuit.

According to one embodiment, one potential transformer 214 and one current transformer 212 are disposed about each phase of a three-phase power distribution system 215. Transformers 212 and 214 are located on the load-side of the circuit breaker contacts 217. Transformers 214 are arranged to inject a test voltage onto the load side of the distribution circuit 215. The test voltage is less than the line voltage (the voltage from the line side 215 of the electrical distribution circuit to ground). The test voltage induces a test current in each phase of the load side of the distribution circuit 215, which is sampled by transformers 212. Current transformers 212 provide a current signal indicative of the sampled test current to a conditioning circuit 216 of fault lockout portion 200.

Conditioning circuit 216 includes multiplexers 218 and 220, a sample and hold amplifier 222, and a signal generator 226. Multiplexer 218 receives the current signals from transformers 212 via lines 228. Multiplexer 218 arranges the current signals in interleaved fashion, and provides a string of signals to a sample and hold amplifier 222. Sample and hold amplifier 222 amplifies the signals and then provides the string of signals to an analog to a digital (A/D) converter 224. A/D converter 224 converts the signals to square waveforms and provides the digitized signals to data bus 230. Signal generator 226 and output multiplexer 220 provide the voltage signal to be injected by transformers 214. Signal generator 226 receives digitized signals from a processor 232 via data bus 230 and outputs a string of voltage signals to output multiplexer 220. Output multiplexer 220 de-multiplexes the string of voltage signals, and provides the voltage signals to lines 234, where the voltage signals are received by transformers 214 to be injected on each phase of the power distribution circuit 215.

Data bus 230 allows data communications between A/D converter 224, microprocessor 232, RAM (random access memory) 236, signal generator 226, ROM (read only memory) 238, NVM (nonvolatile memory) 240, a fault lockout module 242, an I/O (input/output) port 244, and an output control module 246. Processor 232 receives the digitized signals output by A/D converter 224. Processor 232 stores these signals in its associated memory registers and executes instructions based on these signals and program instructions received from RAM 236 or ROM 238. Based on one or more of these inputs, processor 232 outputs a control signal to fault lockout module 242 or signal generator 226. Calibration, testing, programming and other features are accomplished through a communications I/O port 244, which communicates with microprocessor 232 via bus 230. ROM 238 includes fault lockout protection controller application code, e.g., main functionality firmware, including initializing parameters, and boot code. The application code further includes code for a fault lockout algorithm, described hereinafter. Non-volatile memory 240 may include, for example, EEPROM (electronic erasable programmable read only memory) for the storage of operational parameters such as electrical current and harmonic threshold settings, described hereinafter. Parameters in non-volatile memory 240 may be stored at the factory and are selected to meet customers' requirements, but can also be remotely downloaded through the I/O port 244A.

Fault lockout module 242 includes a fault lockout device 248 and a fault lockout flag 250. Fault lockout device 248 is arranged to receive a lockout signal from processor 232 via bus 230 and prevent the closure of the circuit breaker contacts 217 when the lockout signal is received. Fault lockout device 248 may comprise, for example, an electromechanical device, such as a solenoid that acts to physically restrain the circuit breaker contacts 217 via a mechanical link 219. Fault lockout flag 250 is arranged to receive the lockout signal from processor 232 via bus 230 and provide a signal to a remote indicator (not shown).

Preferably, data bus 230, microprocessor 232, RAM 236, ROM 238, NVM 240, analog to digital converter 224, and I/O port 244 form part of an electronic trip unit (circuit breaker controller) 251, such as that described in U.S. Pat. No. 4,672,501. The fault lockout controller 248 and fault lockout flag 250 are contained within module 242 for insertion in a separate compartment within the circuit breaker case, as described in aforementioned U.S. Pat. No. 4,754,247.

In operation, processor 232 provides an initiating signal indicative of a known frequency to signal generator 226 via data bus 230. Upon receipt of the initiating signal, signal generator 226 applies a string of signals to output multiplexer 220. Output multiplexer 220 de-multiplexes the string of signals and provides a test voltage signal to each voltage transformer 214 via lines 234. Transformers 214 inject these test voltage signals to each phase of the electrical distribution circuit. Processor 232 waits for a delay period to allow transient effects of the injected signals to settle, and then accepts the sampled test current signals provided by current transformers 212 through conditioning circuit 216. This process is repeated by injecting test voltages at different frequencies, which are selected by processor 232 based on stored instructions. Processor 232 uses the sampled signals to determine a representative current for the load side of the distribution circuit 215 and then compares the representative current with a predetermined current threshold value stored in non-volatile memory 240. If the current is above this threshold, processor 232 provides a lockout signal to the fault lockout device 248 and fault lockout flag 250. Upon receiving this lockout signal, fault lockout device 248 prevents the closure of the breaker contacts 217, and fault lockout flag 250 provides for remote indication of breaker lockout. If the current is below the threshold value, fault lockout device 248 is not activated, and the circuit breaker contacts 217 are allowed to close.

Alternatively, after processor 232 waits for the delay period to allow transient effects of the injected signals to settle, processor 232 then accepts the sampled current signals provided by current transformers 212 and sampled voltage signals provided by voltage transformers 214 through conditioning circuit 216. This process is repeated by injecting voltages at different frequencies, which are selected by processor 232 based on stored instructions. Processor 232 uses the sampled voltage and current signals to determine a representative impedance for the load side of the distribution circuit 215. The processor 232 can determine the impedance by dividing the root-mean-square (RMS) voltage by the RMS current. Processor 232 can also determine the phase angle between the current and the voltage, and can determine the resistance and inductance of the load side of the electrical distribution system at each frequency. After processor 232 determines the representative impedance, it then compares the representative impedance with a predetermined impedance threshold value stored in non-volatile memory 240. If the impedance is below this threshold, processor 232 provides a lockout signal to the fault lockout device 248 and fault lockout flag 250.

Figure 9:
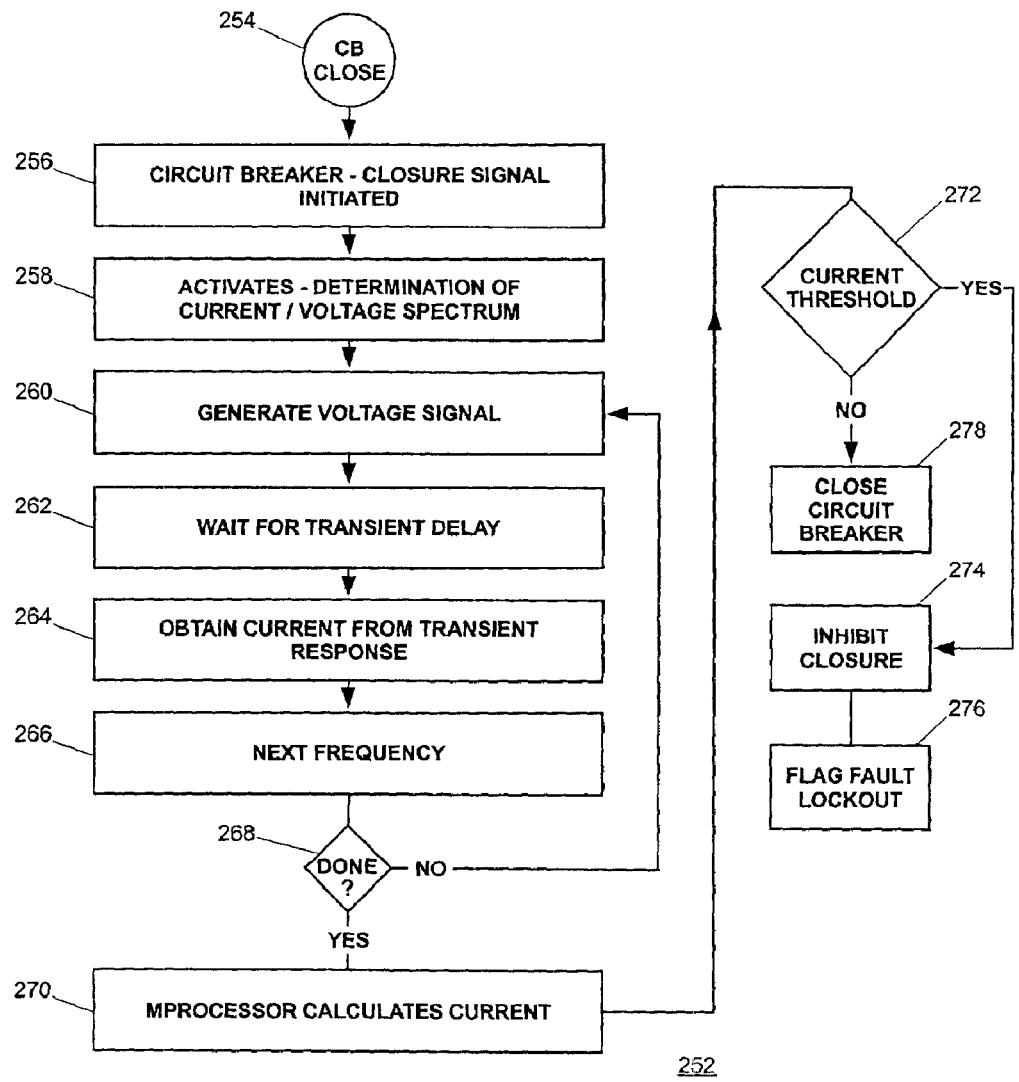
FIG. 9 is a flow diagram of an algorithm for use in the second portion of the circuit breaker.

Referring to FIGS. 8 and 9, a fault lockout algorithm 252 for use in fault lockout protection controller 210 is shown. On initiating circuit breaker contact closure 254, the microprocessor 232 outputs a circuit breaker contacts closure signal 256. Because harmonic voltages and currents may already be present in the power system 215, errors can be introduced. To eliminate such errors, a scan of voltage and current harmonics is performed 258. The results of this scan are used by processor 232 to prevent the use of frequencies where significant harmonics (i.e. harmonics above a predetermined threshold value) are present. A predetermined frequency is then set to a minimum (first) value, such as 120 Hz or the second harmonic of a 60 Hz fundamental. If frequencies are to be scanned below the fundamental frequency, the sequence would begin with, for example, 30 Hz, continuing to 15, 7.5 Hz, etc. A test voltage signal of the predetermined frequency is then generated 260 and applied to each phase of the electrical distribution circuit. After the delay period has expired 262 an electrical current value is obtained from the electrical distribution circuit 264, and the frequency is changed (e.g., incremented to the next resonant frequency) 266. It is then determined whether the electrical distribution system 215 has been analyzed for all frequencies of interest 268. This can be performed, for example, by referring to instructions stored in the memory associated with processor 232. If additional relevant frequencies are to be analyzed, the process returns to 260, where another voltage signal is generated. If no additional frequencies are to be analyzed, microprocessor 232 calculates a representative current value for the electrical distribution system 215 using the test current values sampled at the various frequencies 270. The representative current value is then compared to a threshold current value 272. If there is no fault present, the circuit breaker contacts 217 are closed 278. If the representative current exceeds the current threshold value, indicating a fault in the load side of the electrical distribution circuit 215, the circuit breaker contacts 217 are inhibited from closing 274 and the existence of a fault is indicated 276. Thus, the breaker contacts 217 are prevented from closing onto high-level short circuit conditions.

Figure 10:
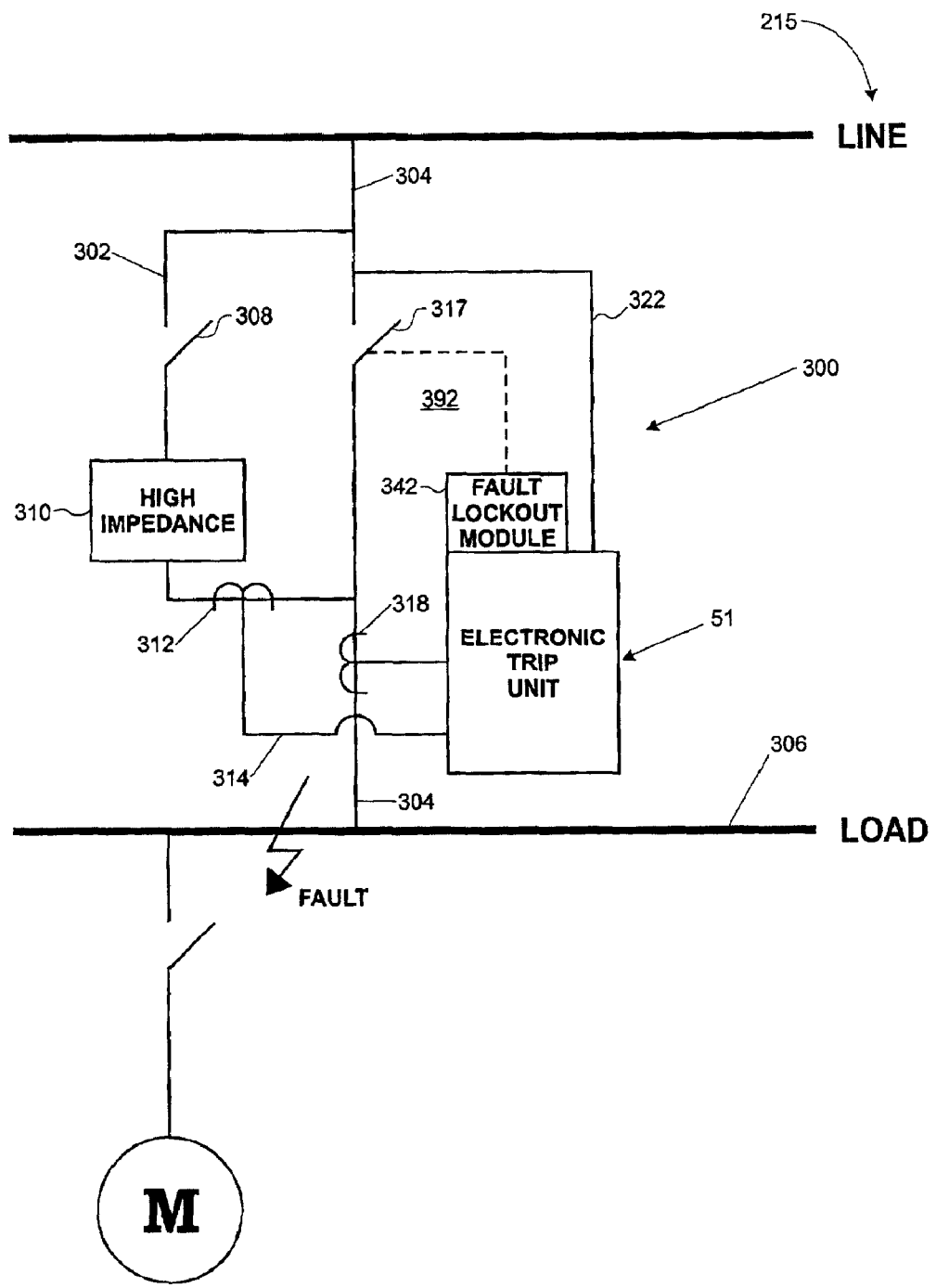
FIG. 10 is a schematic block diagram showing an alternate second portion of the present invention.

FIG. 10 is a single line diagram for a fault lockout protection controller 300 according to another embodiment of the present invention. Fault lockout protection controller 300 is advantageously integrated as fault lockout portion 200 of the circuit. Fault lockout protection controller 300 includes a contact bypass line 302 connected parallel to a supply line 304 of a protected circuit 306 for providing a test voltage to the load side of the distribution circuit 315. Contact bypass line 302 includes an auxiliary switch 308 for interrupting the flow of electrical current in contact bypass line 302. Contact bypass line 302 also includes a high impedance device 310 for reducing the voltage on the load side of distribution circuit 215 to below line voltage. Line 302 further includes a current transformer 312 for providing a signal indicative of current in contact bypass line 302 (current signal) to a current sample line 314.

Supply line 304 includes main contacts 317 of a circuit breaker for interrupting the flow of electrical current in supply line 304. A current transformer 318 is disposed about supply line 304 for providing a signal indicative of the current in supply line 304 to an electronic trip unit 351. Electronic trip unit 351 senses current in supply line 304, and opens main contacts 317 on the presence of overcurrent in line 304, as described in aforementioned U.S. Pat. No. 4,672,501. Line 314 provides the current signal from current transformer 312 to electronic trip unit 51. A voltage sample line 322 provides a signal indicative of supply line 304 voltage (voltage signal) to the electronic trip unit 51. Electronic trip unit 51 is powered by voltage from the line side of supply line 104 or through an auxiliary power supply (not shown).

Prior to closing breaker contacts 217, auxiliary switch 308 is closed to allow test current to flow through contact bypass line 302. Current passing through contact bypass line 302 is sensed by current transformer 312, which provides the current signal indicative of the current through bypass line 302 to line 314. Electronic trip unit 51 receives the current signal from line 314. If the current signal received by electronic trip unit 51 indicates a current below a predetermined current threshold value, then the main contacts 217 are allowed to close. If the current signal received by electronic trip unit 51 indicates a current above the predetermined threshold value, indicating a short circuit on the load side of circuit, then a lockout signal is generated by the electronic trip unit 51 to prevent closure of the breaker contacts 217. Thus, the breaker contacts 217 are prevented from closing onto high-level short circuit conditions, and impedance device 310 protects the electronic trip unit 51 and current transformer 312 from the high currents associated with a short circuit. Additionally, the electronic trip unit 51 can generate an alarm activation/indication signal to indicate a short circuit.

In an alternate embodiment, current transformer 318 senses current passing through contact bypass line 302 to provide a signal indicative of this sensed current to the electronic trip unit 51. In this embodiment, current transformer 312 and line 314 are not needed in fault lockout portion 200 of the circuit breaker.

Figure 11:
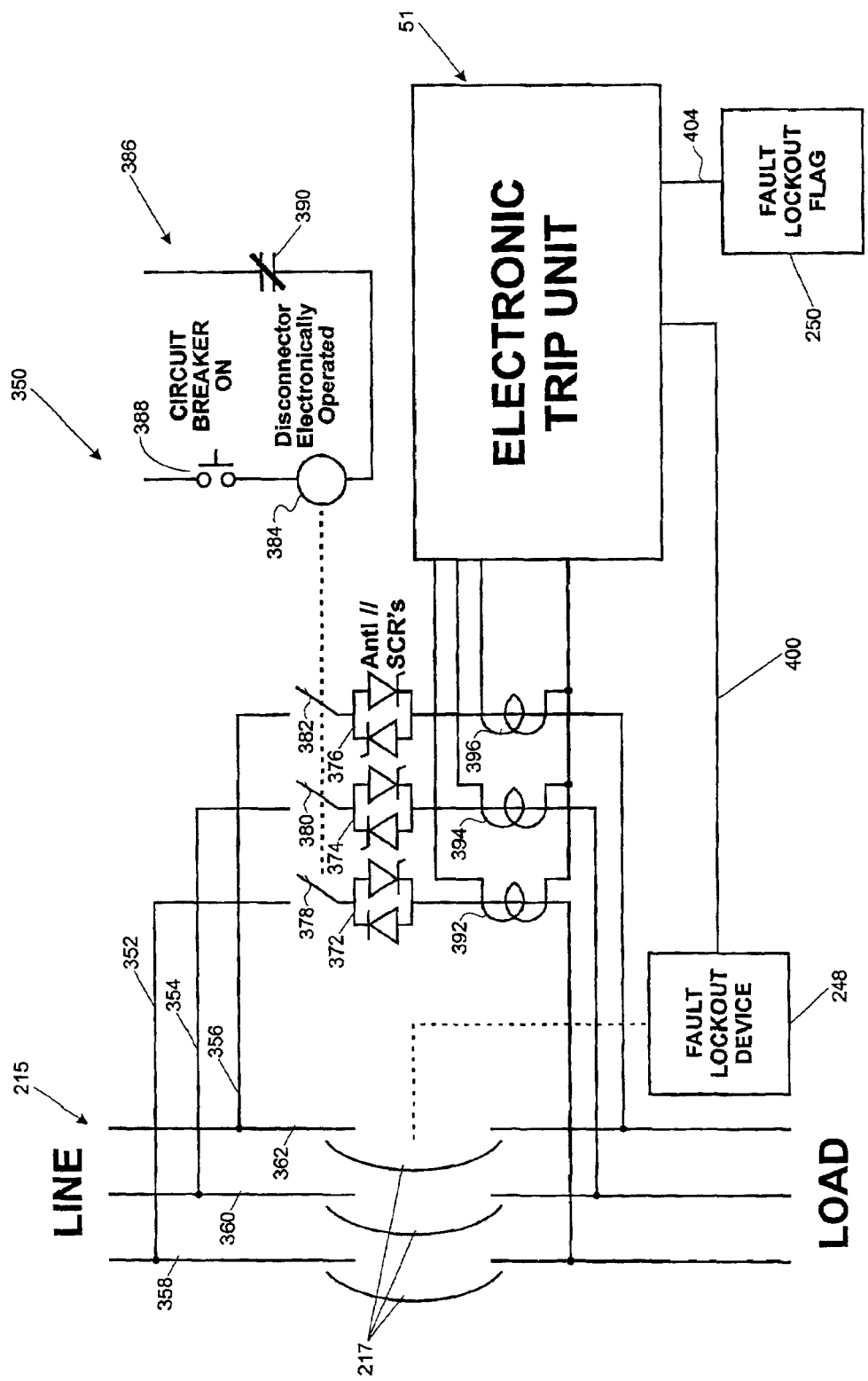
FIG. 11 is schematic block diagram showing another alternate second portion of the present invention.

FIG. 11 shows a fault lockout protection controller 350 according to another embodiment of the present invention. In FIG. 11, contact bypass lines 352, 354, and 356 are connected parallel to supply lines 358, 360, and 362, respectively, to provide test voltage to the load side of distribution circuit 215. Supply lines 358, 360, 362 include main contacts 217 for interrupting the flow of electrical current in supply lines 358, 360, 362. Main contacts 217 are controlled by an electronic trip unit 51 such as that described in aforementioned U.S. Pat. No. 4,672,501. Each contact bypass line 352, 354, 356 includes silicon controlled rectifiers in anti-parallel pairs 372, 374, 376 and an auxiliary switch 378, 380, 382. Silicon controlled rectifiers (SCRs) 372, 374, 376 are arranged to ramp-up the voltage in contact bypass lines 352, 354, 356, respectively, over time. SCRs 372, 374, 376 control the voltage in lines 352, 354, 356 by allowing passage of current in contact bypass lines 352, 354, 356 only after "θ" radians past the start of each positive cycle of the current wave. In other words, SCRs 372, 374, 376 allow only part of each current wave to pass. SCRs 372, 374, 376 ramp-up the voltage by decreasing θ over time, thus allowing more of the current wave to pass. For example, SCRs 372, 374, 376 can be arranged to increase the test voltage from zero volts to some predetermined voltage (e.g. line voltage) over several cycles. Auxiliary switches 378, 380, 382 are arranged to allow the flow of electrical current in contact bypass lines 352, 354, 356, respectively, immediately before breaker closing. Auxiliary switches 378, 380, 382 are operated by a disconnect or 384 included in a starter circuit 386. Starter circuit 386 also includes a normally open activation switch 388 and a normally closed auxiliary switch 390, which are connected in series to disconnect or 384. Starter circuit 386 receives power from an auxiliary source (not shown).

Disposed about each contact bypass line 352, 354, 356 are current transformers 392, 394, 396, respectively. Current transformers 392, 394, 396 sense the electrical current in contact bypass lines 352, 354, 356 and provide a signal indicative of this sensed current (current signal) to the electronic trip unit 51.

Electronic trip unit 51 is arranged to provide a lockout signal to a fault lockout device 248 via a line 400 and to a fault lockout flag 250 via a line 404. Fault lockout device 248 is arranged to prevent the closure of contacts 217 when the lockout signal is received. Fault lockout device comprises, for example, an electromechanical device, such as a solenoid, connected to contacts 217 via a mechanical link 219. Fault lockout flag 250 is arranged to provide a signal to a remote indicator (not shown) when the lockout signal is received.

To close circuit breaker, the activation switch 388 is depressed, providing electrical current to disconnect or 384. When energized, disconnect or 384 acts to close auxiliary switches 378, 380, 382. Auxiliary switches 378, 380, 382 allow a test current to pass on contact bypass lines 352, 354, 356 from the line side of breaker contacts 217 to the load side of breaker contacts 217 through SCRs 372, 374, 376. SCRs 372, 374, 376 gradually increase voltage over time, thus eliminating the switching transient current on contact bypass lines 352, 354, 356. Electronic trip unit 51 receives current signals from transformers 392, 394, 396, and determines a load side current value from the current signals. If the current value determined by electronic trip unit 51 is below a predetermined threshold value, indicating no fault, then voltage on lines 352, 354, 356 is ramped up to its full, predetermined voltage by SCRs 372, 374, 376 and the main contacts 217 are allowed to close. Alternatively, if the current value determined by electronic trip unit 51 is below the predetermined threshold value, indicating no fault, then the main contacts 217 are allowed to close and voltage on lines 352, 354, 356 is ramped up to its full, predetermined voltage by SCRs 372, 374, 376. If the current value is above a predetermined current threshold value, indicating a short circuit on the load side of circuit 215, then a lockout signal is provided by the electronic trip unit 51 to breaker lockout device 248, preventing closure of the breaker contacts 217. Thus, the breaker contacts 217 are prevented from closing onto high-level short circuit conditions, and SCRs 372, 374, 376 protect the electronic trip unit 51 from the high currents associated with a short circuit. Additionally, the electronic trip unit 51 provides the lockout signal to fault lockout flag 250, which provides for remote indication of the fault condition.

Figure 12:
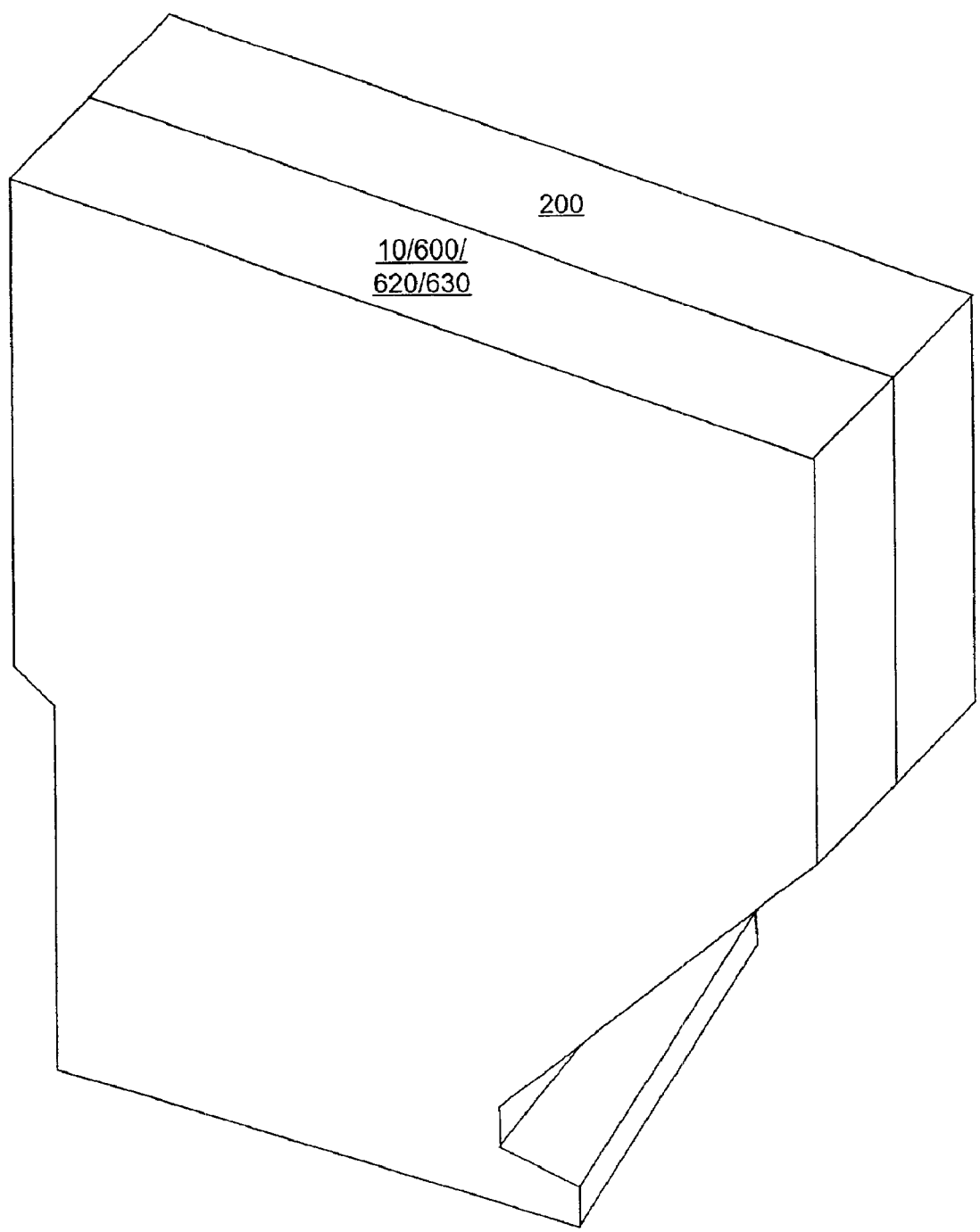
FIG. 12 is a circuit breaker according to one aspect of the present invention.

Referring next to FIG. 12, a circuit breaker 500 including both arc fault portion 10 and fault lockout portion 200 is shown. Circuit breaker 500 advantageously provides the features of fault lockout protection—which eliminates the risk of closing the circuit breaker onto a severe short circuits in certain situations described above and arc fault short circuit protection. The resulting circuit breaker 500 provides for a minimum of short circuit damage, therefore maximizing process up time. The combination of arc fault portion 10 and fault lockout portion 200 also reduces the incidence of personal injury and fires that may result from dangerous electrical faults, and protects the electrical equipment from damage. Similarly, Circuit breaker 500 may include the combination of fault lockout portion 200 with circuit breakers 600, 620, and/or 630, or any other arc fault circuit breaker.

A circuit breaker having a fault lockout protection controller and arc fault protection has herein been described for preventing closure of the breaker contacts onto high-level short circuit conditions and for eliminating arcing. Because the possibility of closure onto short circuit conditions is eliminated, there is no longer a need for the stronger latching mechanism and tighter tolerances required to compensate for the high fault currents associated with closing onto a short circuit condition. As a result, the present invention would result in a lower cost, lighter, faster circuit breaker contacts and closing mechanism that allow the circuit breaker to open and interrupt overcurrent fault currents more efficiently.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A circuit breaker comprising:
   a circuit breaker contact and closing mechanism having at least one separable circuit breaker contact;
   an arc fault protection portion, the arc fault protection portion trips the circuit breaker upon detection of an arc fault condition; and
   a fault lockout protection portion, the fault lockout protection portion prevents closure of the at least one separable circuit breaker contact upon detection of a fault condition on the load side of an electrical distribution circuit, reducing the overall mechanical and thermal stress on the circuit breaker contact and closing mechanism that would result from closing onto a short circuit fault.

2. The circuit breaker of claim 1, further comprising an enclosure for integrally housing the arc fault protection portion and the fault lockout protection portion.

3. A circuit breaker comprising:
   an arc fault protection portion; and
   a fault lockout protection portion;
   wherein the arc fault protection portion of the circuit breaker comprises:
   a pair of separable contacts for interrupting current to a protected load;
   a first housing having a first compartment enclosing the pair of separable contacts;
   a second housing having a second compartment and having at least one opening, communicating between the first compartment and the second compartment, the second housing assembled to the first housing to enclose the first compartment; a
   bimetallic or shunt element having a resistive impedance thereby generating a voltage signal indicative of the current, the bimetallic or shunt element disposed within the first compartment and conducting the current therethrough;
   a stud extending from the bimetallic or shunt element into the second compartment through the at least one opening;
   a conductor electrically connected to the bimetallic or shunt element and routed into the second compartment through the at least one opening, the conductor and the stud conducting the voltage signal indicative of the current; and
   a circuit board having a circuit thereon disposed within the second compartment, the circuit board electrically connected to the conductor and the stud, wherein the circuit board processes the voltage signal to determine if a fault or over current condition exists.

4. The circuit breaker of claim 3, wherein the circuit board comprises:
   a first conductive path disposed on the circuit board, the first conductive path electrically connected to the stud for conducting the voltage signal; and
   a second conductive path disposed on the circuit board, the second conductive path electrically connected to the conductor for conducting the voltage signal;
   wherein the first and second conductive paths run substantially parallel and proximate to each other for a predetermined distance.

5. The circuit breaker of claim 3, wherein the bimetallic element is calibrated to flex a predetermined distance when a predetermined current threshold is reached.

6. The circuit breaker of claim 3, wherein the circuit board processes the voltage signal to detect arcing of the current, the circuit board generating a trip signal to trip the circuit breaker when the arcing is detected.

7. The circuit breaker of claim 3, wherein the at least one opening comprises a first opening having the stud extend therethrough, and a second opening having the conductor routed therethrough.

8. The circuit breaker of claim 3, wherein the first and second conductive paths are traces disposed on the circuit board.

9. A circuit breaker comprising:
   an arc fault protection portion; and
   a fault lockout protection portion, wherein the fault lockout portion comprises:
   a fault lockout protection controller for providing fault lockout protection in the circuit breaker, the circuit breaker having a plurality of contacts forming a part of an electrical distribution circuit, the contacts being separable to isolate a load side of the electrical distribution circuit from a line side of the electrical distribution circuit, the line side having a line voltage, the fault lockout protection controller comprising:
   a sensing device arranged for sensing a first test current in the load side of the electrical distribution circuit, the first test current being induced by a first test voltage, the first test voltage being less than the line voltage and having a first frequency, the sensing device providing a first sensed signal indicative of an electrical characteristic of the first test current;
   a processor arranged to detect a fault condition on the load side of the electrical distribution circuit in response to the first sensed signal, the processor generating a fault lockout signal when the fault condition is detected; and
   a fault lockout device arranged to prevent closure of the plurality of contacts in response to the fault lockout signal.

10. The circuit breaker of claim 9, wherein the fault lockout protection controller further comprises:
    a fault lockout flag arranged to provide indication of the fault condition in response to the fault lockout signal.

11. The circuit breaker of claim 9, wherein the fault lockout protection controller further comprises:
    a signal generator arranged to receive a first initiating signal from the processor and generate a first voltage signal in response to the first initiating signal; and
    a voltage transformer arranged to provide the first test voltage to the load side of the distribution circuit in response to the first voltage signal.

12. The circuit breaker of claim 11, wherein
the signal generator is further arranged to receive a second initiating signal from the processor and generate a second voltage signal in response to the second initiating signal;
the voltage transformer is further arranged to provide a second test voltage having a second test frequency to the load side of the distribution circuit in response to the second voltage signal;
the sensing device is further arranged for sensing a second test current in the load side of the electrical distribution circuit, the second test current being induced by the second test voltage, the sensing device providing a second sensed signal indicative of an electrical characteristic of the second test current; and
the processor is further arranged to detect a fault condition on the load side of the electrical distribution circuit in response to the first and second sensed signals.

13. The circuit breaker of claim 9, wherein the sensing device is a current transformer.

14. The circuit breaker of claim 9, wherein the processor calculates a value indicative of a load side current in response to the first sensed signal and compares the value to a predetermined current threshold to detect the fault condition.

15. The circuit breaker of claim 9, wherein the processor calculates a value indicative of a load side impedance in response to the first sensed signal and compares the value to a predetermined impedance threshold to detect the fault condition.

16. The circuit breaker of claim 9, further including:
an impedance device arranged parallel to the plurality of contacts, the impedance device for reducing the line voltage to the first test voltage.

17. The fault lockout protection controller of claim 16, wherein the impedance device is arranged to increase the first test voltage over a period of time.

18. The fault lockout protection controller of claim 17, wherein the impedance device is a silicon controlled rectifier.

19. A circuit breaker comprising:
an arc fault protection portion; and
a fault lockout protection portion wherein the fault lockout portion comprises:
a plurality of contacts forming part of an electrical distribution circuit, the contacts being separable to isolate a load side of the electrical distribution circuit from a line side of the electrical distribution circuit, the line side having a line voltage;
a sensing device arranged for sensing a first test current in the load side of the electrical distribution circuit, the first test current being induced by a first test voltage, the first test voltage being less than the line voltage and having a first frequency, the sensing device providing a first sensed signal indicative of an electrical characteristic of the first test current;
a processor arranged to detect a fault condition on the load side of the electrical distribution circuit in response to the first sensed signal, the processor generating a fault lockout signal when the fault condition is detected; and
a fault lockout device arranged to prevent closure of the plurality of contacts in response to the fault lockout signal.

20. The circuit breaker of claim 19, further comprising:
a fault lockout flag arranged to provide indication of the fault condition in response to the fault lockout signal.

21. A method of providing fault lockout protection and arc fault protection in a circuit breaker, the method comprising:
sensing a first test current to provide a first sensed signal indicative of an electrical characteristic of the first test current;
detecting a fault condition on the load side of the electrical distribution circuit in response to the first sensed signal;
sensing a voltage across a bimetal to provide a second sensed signal indicative of an electrical characteristic of the voltage across the bimetal;
detecting an arc fault condition when rapid changes in the voltage across the bimetal are sensed;
providing a first test voltage at a first frequency to the load side of the electrical distribution circuit to induce the first test current in the load side of electrical distribution circuit, the first test voltage being less than the line voltage; and
wherein the circuit breaker comprises a plurality of contacts forming part of an electrical distribution circuit, the contacts being separable to isolate a load side of the electrical distribution from a line side of the electrical distribution circuit, the line side having a line voltage.

22. The method of claim 21, further comprising:
providing a second test voltage at a second frequency to the load side of the distribution circuit to induce a second test current in the load side of the distribution circuit, the second test voltage being less than the line voltage; and
sensing the second test current on the load side of the electrical distribution circuit to provide a third sensed signal indicative of the electrical characteristic of the second test current, the detecting the fault condition on the load side of the electrical distribution circuit is in response to the first and third sensed signals.

23. The method of claim 22, further including:
scanning a plurality of harmonic frequencies in the load side of the electrical distribution circuit; and
comparing the plurality of harmonic frequencies to a predetermined frequency threshold to determine the first and second frequencies.

24. The method of claim 22, further including:
scanning a plurality of harmonic frequencies in the load side of the electrical distribution circuit; and
comparing the plurality of harmonic frequencies to a predetermined frequency threshold to determine the first and second frequencies.

25. A method of providing fault lockout protection and arc fault protection in a circuit breaker, the method comprising:
sensing a first test current to provide a first sensed signal indicative of an electrical characteristic of the first test current;
detecting a fault condition on the load side of the electrical distribution circuit in response to the first sensed signal;
generating a fault lock-out signal when a fault condition is detected;
sensing a voltage across a bimetal to provide a second sensed signal indicative of an electrical characteristic of the voltage across the bimetal; and
detecting an arc fault condition when rapid changes in the voltage across the bimetal are sensed;
wherein the detecting a fault condition on the load side of the electrical distribution circuit includes:.

calculating a value indicative of a load side current in response to the first sensed signal; and comparing the value to a predetermined current threshold.

26. A method of providing fault lockout protection and arc fault protection in a circuit breaker, the method comprising:

sensing a first test current to provide a first sensed signal indicative of an electrical characteristic of the first test current;

detecting a fault condition on the load side of the electrical distribution circuit in response to the first sensed signal; wherein the detecting a fault condition on the load side of the electrical distribution circuit includes:

calculating a value indicative of a load side impedance in response to the first sensed signal; and comparing the impedance value to a predetermined impedance threshold; and sensing a voltage across a bimetal to provide a second sensed signal indicative of an electrical characteristic of the voltage across the bimetal; and detecting an arc fault condition when rapid changes in the voltage across the bimetal are sensed.

* * * * *